United States Patent Office 3,291,788
Patented Dec. 13, 1966

3,291,788
CATIONIC TRIAZOLE DISAZO DYESTUFFS
Wataru Yamaya, Kitakyushu-shi, and Koji Matsui, Kiryu-shi, Japan, assignors to Mitsubishi Chemical Industries Limited, Tokyo, Japan, a corporation
No Drawing. Filed Sept. 27, 1965, Ser. No. 490,659
7 Claims. (Cl. 260—157)

The present application is a continuation-in-part of copending application Serial No. 286,937 filed June 11, 1963.

The present invention relates to new cationic dyestuffs.

The present invention provides new valuable cationic dyestuffs suitable for colouring natural or synthetic fibrous materials and plastics, more particularly polyacrylonitrile fibrous materials in reddish shades having excellent fastness, especially wet fastness resisting potting test.

The present invention also provides methods of manufacturing the new cationic dyestuffs and of colouring the aforementioned fibrous materials and plastics by the use of the new cationic dyestuffs.

The new cationic dyestuffs of the present invention are indicated by the general Formula 1:

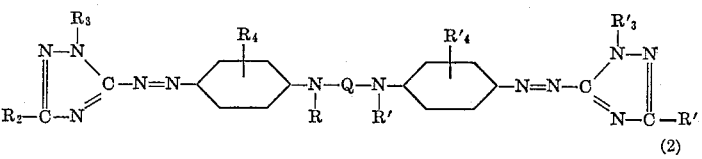

wherein R and R' each is a radical taken from the class consisting of methyl, ethyl, β-hydroxyethyl, β-cyanoethyl, γ-hydroxypropyl, γ-methoxy-β-hydroxy-propyl, benzyl and hydrogen atom; $R_1$ and $R'_1$ each is a radical taken from the class consisting of methyl, ethyl and benzyl; $R_2$ and $R'_2$ each is a radical taken from the class consisting of hydrogen atom, methyl, ethyl, phenyl and benzyl; $R_3$ and $R'_3$ each is a radical taken from the class consisting of hydrogen atom, methyl, ethyl and benzyl; $R_4$ and $R'_4$ each is a radical taken from the class consisting of hydrogen, methyl, methoxy and chlorine atom; Q is a divalent radical taken from the class consisting of ethylene, oxydiethylene, dioxytriethylene, p-toluidino - N·N - diethylene, p-xylylene 2-methyl-p-xylylene, 2-methoxy-p - xylylene, 2-chloro-p-xylylene and 2,5-dimethyl-p-xylylene.

The novel cationic dyestuffs of the invention will be shown in the examples set forth later as embodiments of the invention.

The new cationic dyestuffs indicated by the Formula 1 may be manufactured by coupling in conventional manner 1 mol of a compound indicated by the Formula 3:

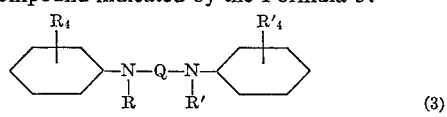

with 1 mol of a diazotized compound indicated by the Formula 4:

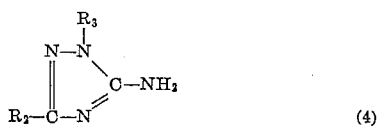

and 1 mol of a diazotized compound of the Formula 5:

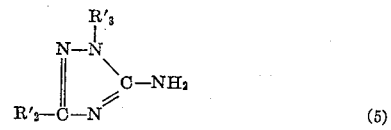

to produce a disazo compound indicated by the Formula 2:

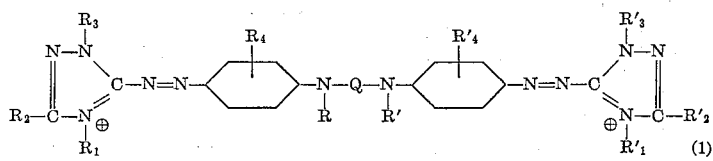

followed by the reaction of the resultant disazo compound of Formula 2 with a suitable alkylating agent which allows said disazo compound to convert to a cationic disazo dyestuff of the Formula 1.

The compound indicated by the Formula 3 is produced by the following reaction formula:

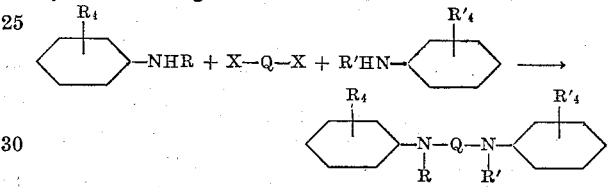

wherein X denotes chlorine atom or bromine atom. For example, ethyleneglycol-bis-(2-N-ethyl - N - phenylamino ethyl)ether is prepared by condensing 2 mol of N-ethyl aniline with 1 mol of ethylene-glycol-bis-(2-chloroethyl) ether in the presence of an acid-binding agent such as sodium carbonate. Also, ω,ω'-bis-(N-ethyl - N - phenylamino)-p-xylene is prepared by condensing 2 mol of N-ethyl aniline with 1 mol of ω,ω'-dibromo-p-xylene. Likewise, N·N-bis-(2-N'-ethyl-N'-phenylamino-ethyl) - p-toluidine is obtained by condensing 2 mol of N-(2-chloroethyl)-N-ethyl aniline with 1 mol of p-toluidine.

The diazotization of 3-amino-1·2·4-triazol or derivatives thereof as shown by the aforementioned Formula 4 or 5 is accomplished in conventional manner by stirring in sulphuric acid together with nitrosylsulphuric acid at a temperature approximately in the range from —10 to +15° C. Subsequently, the resultant diazotized product is coupled by a known method with a compound as indicated by the Formula 3 at a temperature below 15° C. to produce a disazo compound of the Formula 2.

The disazo compound thus obtained of the Formula 2 is then caused to react with an alkylating agent for conversion to a cationic azo dyestuff as indicated by the Formula 1. The suitable alkylating agents include dimethyl sulphate, diethyl sulphate, dibenzyl sulphate, methyl ester of p-toluene sulphonic acid, ethyl ester of p-toluene sulphonic acid, benzyl ester of p-toluene sulphonic acid, methyl iodide, ethyl iodide, benzyl iodide, methyl bromide, ethyl bromide, benzyl bromide, methyl chloride, ethyl chloride, and benzyl chloride.

Usually 1 to 4 mol amount of alkylating agent is used against 1 mol of the disazo compound of Formula 2.

This reaction may be carried out in an inert solvent or diluent such as benzene, toluene, chlorobenzene, o-dichlorobenzene, nitrobenzene, chloroform, carbontetrachloride, dimethyl formamide and acetone. When employed in an excess amount the alkylating agent may constitute a solvent. In some instances, an acid-binding agent such as calcium oxide, calcium carbonate, magnesium oxide and magnesium carbonate may be employed in carrying out the reaction.

The new cationic dyestuffs manufactured by the above-mentioned method are useful for colouring various materials, including fibres, woven or knitted fabrics, and plastics. The dyestuffs find their most practical applications in dyeing and printing fibrous materials made of polyacrylonitrile or of co-polymers comprising acrylonitrile and other vinyl compounds. Blended fibres and union fabrics which are composed of polyacrylonitrile type fibres and wool, silk, cellulosic fibres and/or various synthetic fibres are also suitably dyed by the use of the cationic dyestuffs according to the invention.

The method of dyeing or printing the fibrous materials by the use of the dyestuffs may be performed preferably in an acidic or neutral aqueous medium. In some cases, inorganic or organic salts and/or such dyeing auxiliaries as retarder, swelling agents and thickening agents may be employed. In general, the dyeing starts at a temperature from room temperatures up to 60° C. and is finished at a temperature from 90° C. to 100° C. in order to effect favorable level dyeing. In some cases, the dyeing is effected under an elevated pressure at a temperature above 100° C. In addition to the aforesaid method, there may be further cited a method of colouring which comprises adding the dyestuffs to a spinning bath containing acrylonitrile polymer, followed by spinning.

The dyestuffs of the present invention dye polyacrylonitrile fibrous materials in bluish red to red shades having excellent wet fastness. Especially wet fastness resisting the potting test is excellent. Namely, the shades given to a polyacrylonitrile fibre by the use of the dyestuffs of the present invention are exceedingly fast to a treatment by hot water. For example, the medium to heavy shades given to fibre do not substantially fade in spite of a treatment of hot water, and the staining given to the attached white fibre is not noticeable. For this reason, the dyestuffs in accordance with the invention are conveniently employed in a medium to heavy dyeing of polyacrylonitrile fibre or that of a blended fibre thereof such as polyacrylonitrile-wool blended fibre.

Some preferred embodiments of the invention will be described in detail wherein the examples given are for the purpose of illustrating preferred embodiments only and not for the purpose of limiting the same. The term "part" in the embodiments denotes part by weight provided otherwise specified.

Example 1

13.2 parts of 3-amino-1·2·4-triazol were dissolved in 152 parts of 60% sulphuric acid and cooled to a temperature below −10° C. The resultant solution was diazotized by the addition of nitrosyl sulphuric acid prepared from 10 parts of sodium nitrite and 53 parts of 98% sulphuric acid. Upon completion of the reaction, the diazotized liquid was poured into 300 parts of ice water to decompose excess nitrous acid. Separately, 16.7 parts of ω,ω′₄-bis-(N-ethyl-N-phenylamino)-p-xylene having melting point of 121.5–123° C., obtained by the condensation of 2 mol of monoethyl-analine and 1 mol of ω,ω′-dibromo-p-xylene were disolved in a quantity of 15% sulphuric acid. The resultant solution was added to the aforesaid diazotized liquid at a temperature below 0° C. to effect coupling under stirring for 2 hours. Upon completion of the coupling, the resultant liquid was poured into 1,200 parts of ice water, followed by filtration to take out precipitate, which was washed and dried to obtain a disazo compound as indicated by the following formula:

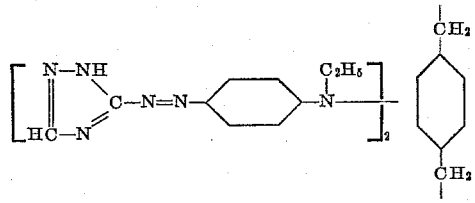

12.0 parts of this disazo compound were dissolved in 240 parts of dimethylformamide (solvent) and 21.6 parts of dimethyl sulphate were added thereto at a room temperature and heated up to 100° C. At this temperature the reaction took place under stirring for 5 hours and the resultant liquid was poured into 1,200 parts of water. The resultant aqeuous solution was subjected to salting out by the addition of zinc chloride and sodium chloride, followed by filtration and drying.

The cationic dyestuffs thus obtained of the following formula showed in methanol solution containing 0.1% acetic acid a maximum absorption wave length at 520 mμ.

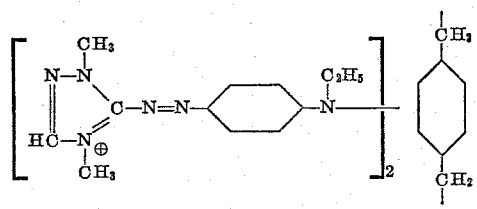

This dyestuff was readily dissolved in water and adapted to dye in a weak acidic aqueous solution polyacrylonitrile fibre in brilliant bluish-red shades having excellent fastness, especially wet fastness resisting the potting test.

Similar dyestuffs were obtained by the employment, in lieu of 3-amino-1·2·4-triazol employed in this example, of 3 - amino - 5 - methyl-1·2·4-triazol, 3-amino-5-ethyl-1·2·4 - triazol, 3 - amino-5-phenyl-1·2·4-triazol, or 3-amino - 5 - benzyl-1·2·4-triazol. Also, similar dyestuffs were obtained by the employment, in lieu of dimethyl sulphate employed in this example, of an alkylating agent such as diethyl sulphate, ethyl bromide, benzylchloride, and methyl or ethyl ester of p-toluene sulphonic acid. Further, similar dyestuffs as shown in the following formula were obtained by reacting in a solvent such as dimethyl-formamide the dyestuffs of this example with an alkylating agent such as diethyl sulphate and ethylbromide.

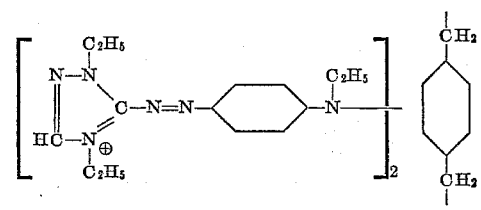

Example 2

8.3 parts of 3-amino-1·2·4-triazol were dissolved in 100 parts of 60% sulphuric acid and cooled to a temperature below −10° C. At this temperature there were added to the resultant liquid nitrosyl sulphuric acid prepared from 6.9 parts of sodium nitrite and 83 parts of 98% sulphuric acid, followed by further addition thereto of sulfamic acid in order to decompose excess nitrous acid. Separately, 16.7 parts of ω,ω′₄-bis-(N-ethyl-N-phenylamino) durene having melting point 168–170° C., obtained from 2 mol of monethyl aniline and 1 mol of ω,ω′₄-dibromodurene were dissolved in 15% sulphuric acid and added to the previously prepared diazotized liquid at −10° C. to effect coupling while stirring for 2 hours.

Upon completion of the coupling, the reaction products were added to 300 parts of water, and the precipitate was filtrated off, washed and dried to obtain a disazo compound as indicated by the following formula:

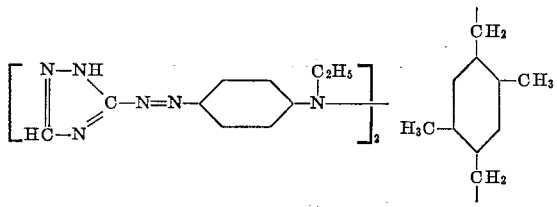

11.2 parts of this compound were added to 224 parts of chlorobenzene, 27.8 parts of diethyl sulphate were further added thereto and heated up to 100° C. The reaction continued for 6 hours under stirring at this temperature and the precipitate was filtrated off. The precipitate was dissolved in 550 parts of water, insoluble matter was removed, and zinc chloride and sodium chloride were added thereto. The precipitate thus formed was filtrated off and dried to obtain 13.7 parts of disazo cationic dyestuff as indicated by the following formula:

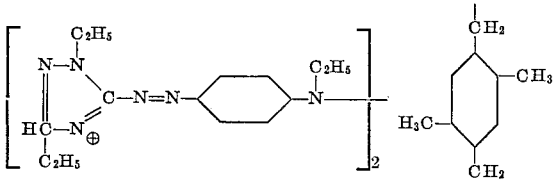

This dyestuff, which indicated in a methanol solution containing 0.1% acetic acid a maximum absorption wave length at 526 mμ, was readily dissolved in water and adapted to dye polyacrylonitrile fiber in a brilliant bluish red having excellent fastness to light and washing.

Similar dyestuffs were obtained by the employment, in lieu of 3-amino-1·2·4-triazol employed in this example, of 3-amino-5-methyl-1·2·4-triazol, 3-amino-5-ethyl-1·2·4-triazol, 3-amino-5-phenyl-1·2·4-triazol, or 3-amino-5-benzyl-1·2·4-triazol. Further, similar dyestuffs were obtained by the employment, in lieu of diethyl sulphate employed in this example, of dimethyl sulphate, methyl ester of p-toluene sulphonic acid, or benzylchloride. Still further, similar dyestuffs were produced by reacting in a solvent such as chlorobenzene the dyestuff in this example with dimethyl sulphate or benzyl chloride.

*Example 3*

11.2 parts of disazo compound obtained by coupling 2 mol amount of 3-amino-1·2·4-triazol diazotized according to the process of Example 2 with 1 mol amount of ω,ω′-bis-(N-ethyl-N-phenylamino) durene were dissolved in 224 parts of dimethylformamide, 3.3 parts of benzyl-chloride were added thereto, reaction continued under stirring for 6 hours at 111° C., 6.9 parts of dimethyl sulphate were added thereto, stirred for 2 hours at 110° C. and cooled. The reaction liquid was subjected to distillation under a reduced pressure to distill off dimethylformamide while discharging the residue into 550 parts of water. After the removal of insoluble matter, the resultant solution was subjected to salting out by the addition of sodium chloride. The precipitate was filtrated off and dried to obtain a disazo cationic dyestuff of the following formula:

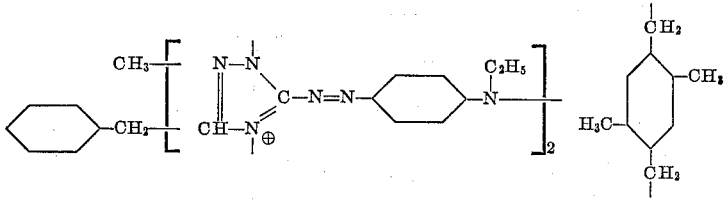

This dyestuff was readily dissolved in water and dyed polyacrylonitrile fibres in clear bluish-red shades having good fastness.

*Example 4*

11.6 parts of 3-amino-1·2·4-triazol were dissolved in 130 parts of 60% sulphuric acid and cooled to a temperature below −10° C. At this temperature the resultant was added to nitrosyl sulphuric acid prepared from 8.8 parts of sodium nitrite and 106 parts of 98% sulphuric acid and diazotized under stirring for 2 hours. The products were poured into 670 parts of ice water, to which a quantity of sulfamic acid was added to decompose excess nitrous acid. Separately, 31 parts of ω₁,ω′₄-bis(N-m-methylphenyl-N-γ-methoxy-β-hydroxy-propylamino) durene having melting point 122–124° C. which had been prepared by condensation of 2 mol of N-γ-methoxy-β-hydroxy-propylamino-m-toluidine and 1 mol of ω₁,ω′₄-dibromo-durene were dissolved in 15% sulphuric acid, and the resultant liquid was added to the diazotized liquid previously obtained for coupling effected at a temperature below −5° C. under stirring for 2 hours. The precipitate was filtrated off, washed and dried to obtain 38 parts of a disazo compound as indicated by the following formula:

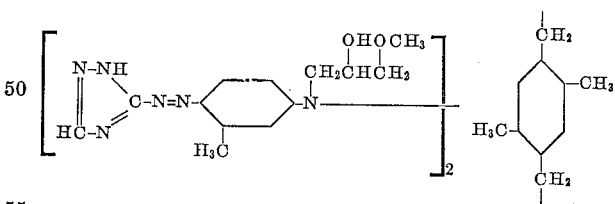

3.6 parts of this compound were admixed with 40 parts of dimethylformamide, to which were added 6.1 parts of dimethyl sulphate for reaction caused at 110° C. under stirring for 5 hours, followed by cooling. The reaction mixture was poured into 350 parts of water, to which were added 2 parts of zinc chloride and 27 parts of sodium chloride to effect salting out. The precipitate was filtrated off and dried to obtain 6.1 parts of the corresponding disazo cationic dyestuff.

The dyestuff thus obtained was easily soluble in water and adapted to dyeing polyacrylonitrile fibres in red shades having excellent fastness to light and washing.

*Examples 5–12*

The disazo compounds as indicated in column A of the following table, produced by the method of Examples 1 to 4 were alkylated by use of the alkylating agents as indicated in column B of the table to obtain disazo cationic dyestuffs adapted to dyeing polyacrylonitrile fibres in the shades as indicated in column C of the table.

| No. | A | B | C |
|---|---|---|---|
| 5 | (structure with N—NH, HC—N, C=N=N, H₃CO, CH₃ on ring, N—CH₂, CH₃ substituted cyclohexyl)₂ | Dimethyl sulphate | Red. |
| 6 | (structure with N—NH, HC—N, C=N=N, OCH₃, C₂H₅, N—CH₂, cyclohexyl)₂ | ....do.... | Bluish red. |
| 7 | (structure with N—NH, HC—N, C=N=N, C₂H₄CN, CH₃ substituted)₂ | Diethyl sulphate | Do. |
| 8 | (structure with N—NH, HC—N, C=N=N, CH₂-phenyl, N—CH₂)₂ | Dimethyl sulphate | Do. |
| 9 | (structure with H₃C, CH₃—C—N, OHOCH₃, CH₂CHCH₃)₂ | Diethyl sulphate | Do. |
| 10 | (structure with CH₃—C—N, Cl, C₂H₅)₂ | Dimethyl sulphate | Do. |
| 11 | (structure with phenyl-C—N, C₂H₅)₂ | ....do.... | Do. |
| 12 | (structure with phenyl-CH₂-C—N, C₂H₄OH)₂ | ....do.... | Do. |

*Example 13*

7 parts of 3-amino-1·2·4-triazol were dissolved in a mixture of 100 parts of glacial acetic acid, 6 parts of sulphuric acid and 60 parts of water, diazotized at a temperature below 0° C. by use of nitrosyl sulphuric acid, which had been produced from 5 parts of sodium nitrite and 12 parts of 98% sulphuric acid, followed by an addition thereto of a liquor produced by dissolving 9.3 parts of bis-(2-N-ethyl-N-phenylamino ethyl) ether, which had been produced as will be described later, in 30 parts of acetic acid for effecting coupling under stirring at the same temperature for 2 hours. Upon completion of the reaction, aqueous 50% sodium hydroxide solution was added thereto in drops until becoming neutral, followed by filtration to take out somewhat sticky cake, which was washed by hot water and dried. Dried crude cake was crushed, suspended in chlorobenzene of an amount ten times larger than the cake, heated under stirring, followed by hot filtration to obtain insoluble matter which was washed by chlorobenzene and dried to obtain refined cake. Thus, the disazo compound as indicated by the following formula was obtained.

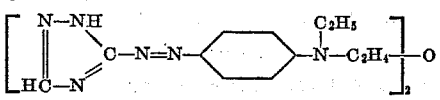

10 parts of this compound were added to 145 parts of dimethylformamide to which added were 15.8 parts of dimethyl sulphate in 2 hours under stirring, subjected to further stirring for 2 hours at 100° C., distillating off about one half amount of dimethylformamide under reduced pressure, cooling, and diluting the whole amount to 500 parts by addition of water. To the reddish liquor thus obtained added were 24 parts of zinc chloride and 30 parts of sodium chloride to effect salting out. The precipitate was filtrated, dissolved in 400 parts of water, subjected to refining by use of active carbon, and further salting out. The precipitate was taken out by filtration and dried.

The cationic dyestuff thus obtained, as indicated by the following formula was readily soluble in water:

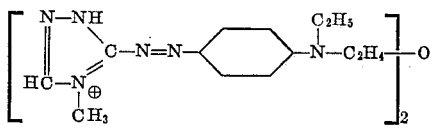

The dyestuff indicated in acetic acid methanol solution a maximum absorption wave length at 505 m$\mu$ and was adapted to dyeing polyacrylonitrile fibres in bluish red shades with excellent fastness to light and washing.

The employment of 3-amino-5-methyl-1·2·4-triazol, 3-amino-5-ethyl-1·2·4-triazol, 3-amino-5-phenyl-1·2·4-triazol or 3-amino-5-benzyl-1·2·4-triazol, in lieu of 3-amino-1·2·4-triazol used in this example, gave a dyestuff similar to that of this example. Likewise, the employment of other alkylating agents, in lieu of dimethyl sulphate used in this example, such as diethyl sulphate, ethyl bromide, benzyl chloride, methyl or ethyl ester of p-toluene sulphonic acid gave similar dyestuffs. Also, similar dyestuffs were obtained by reacting the dyestuff of this example in such solvent as dimethylformamide with an alkylating agent such as diethyl sulphate and benzylchloride.

Example 14

13.2 parts of 3-amino-1·2·4-triazol were dissolved in 152 parts of 60% sulphuric acid, and the resultant solution was diazotized at −10° C. under stirring by the addition of nitrosyl sulphuric acid, which had been produced from 10 parts of sodium nitrite and 53 parts of 98% sulphuric acid. The solution was poured into 300 parts of ice water, and excess nitrous acid was then eliminated by the addition of sulfamic acid.

To the solution thus obtained, there was added a solution of 17.8 parts of ethyleneglycol-bis-(2-N-ethyl-N-phenylamino ethyl) ether in 15% sulphuric acid which had been produced by condensing 2 mol amount of N-ethyl-aniline with 1 mol amount of ethyleneglycol-bis-(2-chloroethyl) ether in the presence of sodium carbonate, followed by stirring for 2 hours at a temperature of −10 to 0° C. The reaction mixture was poured into 1200 parts of ice water, the precipitate was then filtered and was washed thoroughly and dried. Thus, the disazo compound indicated by the following formula was obtained.

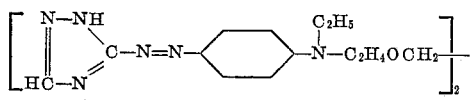

20 parts of this disazo compound were dissolved in 800 parts of chlorobenzene. To the resultant solution there was added while stirring 28 parts of dimethyl sulphate in 20 minutes, and the mixture was stirred for further 5 hours at 110° C. The reaction mixture was cooled and filtered, and so obtained precipitate was dissolved in 4000 parts of water. The solution was salted out by the addition of 200 parts of sodium chloride and 51 parts of zinc chloride. Precipitated dyestuff was then filtered and the filtered cake was washed by water and dried at 60° C.

The cationic dyestuff thus obtained is indicated by the formula below.

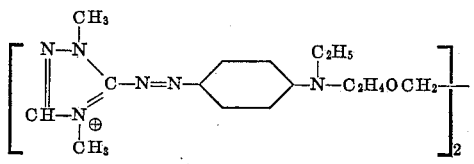

The dyestuff was easily soluble in water and dyed polyacrylonitrile fiber in clear bluish red shades fast to light and washing.

The employment of 3-amino-5-methyl-1·2·4-triazol, 3-amino-5-ethyl-1·2·4-triazol or 3-amino-5-benzyl-1·2·4-triazol, in lieu of 3-amino-1·2·4-triazol of this example, gave similar dyestuffs to that of this example. Likewise, the employment of diethyl sulphate, ethyl bromide or benzyl chloride, in lieu of dimethyl sulphate of this example, gave similar dyestuffs. Also, similar dyestuffs were obtained by reacting the dyestuff of this example with dimethyl sulphate, diethyl sulphate or benzyl chloride.

Example 15

10 parts of disazo compound which had been obtained by coupling 2 mol amount of 3-amino-1·2·4-triazol diazotized by the method of Example 13 with 1 mol amount of N·N-bis(2-N'-ethyl-N'-phenylamino-ethyl)-p-toluidine melting point of 70–71° C.), which had been produced by condensing N-(2-chloroethyl)-N-ethyl aniline with p-toluidine were dissolved in 140 parts of dimethylformamide. To the resultant solution there were added 15.0 parts of diethyl sulphate, and stirred for 4 hours at 100° C., followed by distillation to separate dimethylformamide. The residue was dissolved in 500 parts of water, and 25 parts of zinc chloride and 30 parts of sodium chloride were added thereto to effect salting out. The precipate was taken out by filtration and dried.

The dyestuff thus obtained is indicated by the following formula:

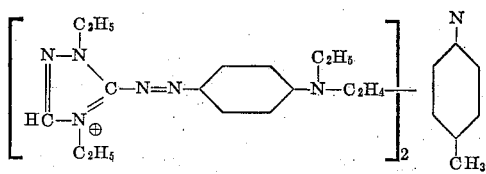

The dyestuff was easily soluble in water and dyed polyacrylonitrile fibres in bluish red shades fast to light and washing.

The employment of, in lieu of 3-amino-1·2·4-triazol of this example, 3-amino-5-methyl-1·2·4-triazol, 3-amino-5-ethyl-1·2·4-triazol or 3-amino-5-benzyl-1·2·4-triazol gave a similar dyestuff. Also, the employment of, in lieu of diethyl sulphate of this example, dimethyl sulphate or benzyl chloride gave a similar dyestuff. Further, the reaction of the dyestuff of this example with dimethyl sulphate, diethyl sulphate or benzylchloride resulted in similar dyestuffs.

Examples 16–22

The disazo compounds as indicated under column A, the following table were alkylated by use of alkylating agents as indicated under column B, the table to obtain disazo cationic dyestuffs are adapted to dye polyacrylonitrile fibres in the shades as indicated under column C, the table.

| Ex. No. | A | B | C |
|---|---|---|---|
| 16 | [pyrazole-N-NH/HC-N-C-N=N-C6H4-N(C2H5)-CH3]2 | Dimethyl sulphate | Rubine. |
| 17 | [pyrazole-N-NH/HC-N-C-N=N-C6H3(Cl)-N(CH3)-C2H4-O]2 | do | Bluish red. |
| 18 | [pyrazole-N-NH/HC-N-C-N=N-C6H3(H3CO)-N(C2H5)-C2H4OCH3]2 | do | Do. |
| 19 | [pyrazole-N-NH/HC-N-C-N=N-C6H4-N(C2H4CN)-C2H4-O]2 | Diethyl sulphate | Do. |
| 20 | [pyrazole-N-NH/HC-N-C-N=N-C6H4-N(C2H4OH)-C2H4OCH3]2 | do | Do. |
| 21 | [pyrazole-N-NH/HC-N-C-N=N-C6H4-N(CH2C6H5)-CH3]2 | do | Do. |
| 22 | [pyrazole-N-NH/H2C-C-N-C-N=N-C6H3(H3C)-N(C2H5)-CH3]2 | do | Do. |

Example 23

0.5 part of a dyestuff mentioned in the previous examples was dissolved in 100 parts of hot water and the solution was added to 4,000 parts of cold water containing 1 part of acetic acid, 2 parts of sodium acetate, and 2 parts of non-ionic surface active agent. Cationic retardant might be further added if desired. Into the dye bath thus obtained immersed were 100 parts of polyacrylonitrile textile material at 40° C. The temperature was elevated up to 95° C. in 30 min. and dyeing was continued for 1 hr. at 95–100° C. The dyestuff was almost entirely absorbed by textile material. Subsequently, the textile material was washed by water, subject to soaping in 5,000 parts of hot water containing 1% detergent for 10 min. at 80–95° C., washed by water and dried.

Acetate-silk, wool or silk might be dyed in the similar manner.

Example 24

A printing paste for colouring was prepared according to the following recipe:

0.1–20 parts of the dyestuff in the previous examples
50 parts of glyecine A* (bis-2-oxyethyl thioether)
50 parts of 30% acetic acid
30 parts of 50% tartaric acid
40 parts of resorcin
60 parts of stock thickening paste (made of Nafka crystal gum, Arabo gum or starch. A mixture of 70% starch paste and 30% Nafka crystal gum paste gives good results)
Make up 1,000 parts with water.

*Glyecine A might be replaced by the equal amount of urea, ε-caprolactam, or methylcellosolve.

Polyacrylonitrile textile was printed by use of said printing paste, steamed for 30 min. at 100° C. The textile was then washed through and soaped for 10 min. at 60° C. Fast printed textile was thus obtained.

Example 25

Polyacrylonitrile-viscose-blended (70:30) textile material was printed by use of the printing paste of following recipe:

2 parts of the dyestuff in the previous examples.
50 parts of glyecine A
50 parts of 30% acetic acid
30 parts of 50% tartaric acid
50 parts of tannin-acetic (1:1)
40 parts of resorcine
600 parts of stock thickening paste
Make up 1,000 parts with water.

The printed textile was then steamed, washed and soaped according to the method as in Example 24. Fast print of good fastness was obtained.

Example 26

0.5 part of dyestuff in the previous examples was added to a spinning liquor comprising 100 parts of polyacrylonitrile (M.W. ca. 60,000) dissolved in 500 parts of dimethylformamide. The solution was ejected from nozzles into hot air to obtain thread, and the thread thus obtained was stretched at 105° C. up to eight times the initial length, washed thoroughly and dried.

What we claim is:

1. Cationic dyestuffs as indicated by the following formula:

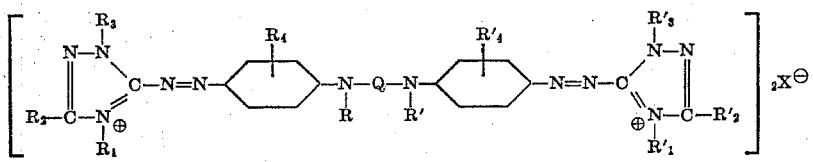

wherein X⊖ is an anion of a quaternizing agent, which does not confer insolubility to the dye molecule, R and R' each is a radical taken from the class consisting of methyl, ethyl, β-hydroxyethyl, β-cyanoethyl, γ-hydroxypropyl, γ-methoxy-β-hydroxy-propyl, benzyl and hydrogen atom; $R_1$ and $R'_1$ each is a radical taken from the class consisting of methyl, ethyl and benzyl; $R_2$ and $R'_2$ each is a radical taken from the class consisting of hydrogen atom, methyl, ethyl, phenyl and benzyl; $R_3$ and $R'_3$ each is a radical taken from the class consisting of hydrogen atom, methyl, ethyl and benzyl; $R_4$ and $R'_4$ each is a radical taken from the class consisting of hydrogen, methyl, methoxy and chlorine atom; Q is a divalent radical taken from the class consisting of ethylene, oxydiethylene, dioxytriethylene, p-toluidino-N·N-diethylene, p-xylylene, 2-methyl-p-xylylene, 2-methoxy-p-xylylene, 2-chloro-p-xylylene and 2,5-dimethyl-p-xylylene.

2. Cationic dyestuffs according to claim 1 in which the cation is indicated by the following formula:

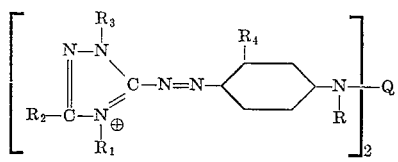

3. Cationic dyestuffs according to claim 1 in which the cation is indicated by the following formula:

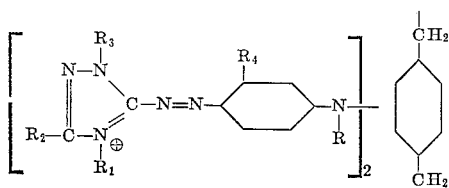

4. Cationic dyestuffs according to claim 1 in which the cation is indicated by the following formula:

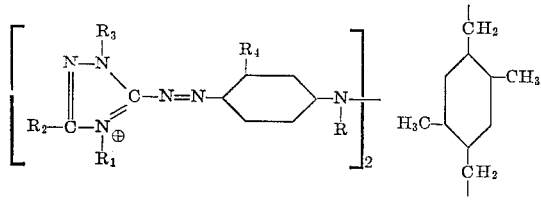

5. Cationic dyestuffs according to claim 1 in which the cation is indicated by the following formula:

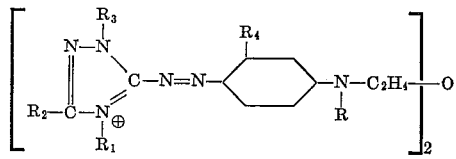

6. Cationic dyestuffs according to claim 1 in which the cation is indicated by the following formula:

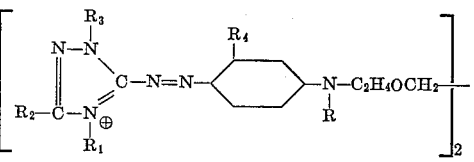

7. Cationic dyestuffs according to claim 1 in which the cation is indicated by the following formula:

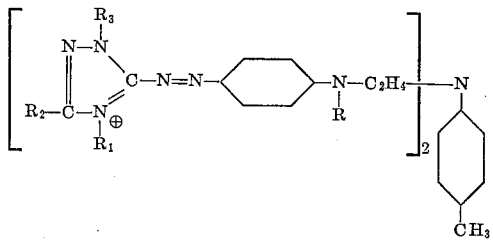

References Cited by the Examiner

UNITED STATES PATENTS

| | | | |
|---|---|---|---|
| 3,078,137 | 2/1963 | Baumann et al. | 260—157 XR |
| 3,102,878 | 9/1963 | Baumann et al. | 260—157 XR |
| 3,148,935 | 9/1965 | Pfitzner et al. | 260—157 XR |

FOREIGN PATENTS 1,256,899  2/1961  France.

CHARLES B. PARKER, *Primary Examiner.*

F. D. HIGEL, *Assistant Examiner.*